United States Patent
Johannessen et al.

(10) Patent No.: US 9,419,534 B2
(45) Date of Patent: Aug. 16, 2016

(54) MODULAR POWER INVERTER WITH SOFTWARE CONTROL

(71) Applicant: B/E AEROSPACE, INC., Wellington, FL (US)

(72) Inventors: Eric Johannessen, Bohemia, NY (US); David P. Eckel, Fort Salonga, NY (US)

(73) Assignee: B/E AEROSPACE, INC., Wellington, FL (US)

( * ) Notice: Subject to any disclaimer, the term of this patent is extended or adjusted under 35 U.S.C. 154(b) by 477 days.

(21) Appl. No.: 13/907,197

(22) Filed: May 31, 2013

(65) Prior Publication Data

US 2013/0342014 A1   Dec. 26, 2013

Related U.S. Application Data

(60) Provisional application No. 61/663,701, filed on Jun. 25, 2012.

(51) Int. Cl.
   *H02M 7/00* (2006.01)

(52) U.S. Cl.
   CPC ............ *H02M 7/003* (2013.01); *Y10T 307/406* (2015.04)

(58) Field of Classification Search
   None
   See application file for complete search history.

(56) References Cited

U.S. PATENT DOCUMENTS

| | | |
|---|---|---|
| 5,315,533 A | 5/1994 | Stich et al. |
| 7,453,235 B2 | 11/2008 | Blair et al. |
| 7,733,069 B2 | 6/2010 | Toyomura et al. |
| 7,843,691 B2 | 11/2010 | Reichert et al. |
| 8,179,109 B2 | 5/2012 | Tang et al. |
| 2012/0063037 A1 | 3/2012 | Konecny et al. |
| 2013/0241444 A1* | 9/2013 | Fotherby .................. H02P 5/74 318/51 |

OTHER PUBLICATIONS

International Search Report and Written Opinion issued in related application PCT/US13/43726 dated Oct. 1, 2013, 10 pages.

* cited by examiner

*Primary Examiner* — Jared Fureman
*Assistant Examiner* — Aqeel Bukhari
(74) *Attorney, Agent, or Firm* — Drinker Biddle & Reath LLP (57) ABSTRACT

A power inverter is provided comprising: a control board comprising: a processor that generates an AC waveform from a pulse width modulation (PWM) signal according to instructions or data stored in a memory associated with the processor; and an output at which a signal having the AC waveform is provided; a power supply module that is connected to the control board, comprising: an input connected to the output of the control board at which the AC waveform signal is provided; and an output at which an AC power signal is provided on a channel of the power inverter.

18 Claims, 6 Drawing Sheets

MODULAR POWER INVERTER WITH SOFTWARE CONTROL

CROSS REFERENCE TO RELATED APPLICATIONS

The present application claims the benefit of U.S. Provisional Application No. 61/663,701, filed Jun. 25, 2012, entitled, "Modular Power Inverter with Software Control", herein incorporated by reference.

BACKGROUND

A power inverter is a device used to convert direct current (DC) into alternating current (AC). Often vehicles will have a primary power source that is DC. However, most passengers have devices that require AC. In the United States, the normal AC power used by devices is 115 VAC at 60 Hz. Thus, when a user travels with, e.g., a laptop, it is desirable for the user to have the particular voltage needed by his device available.

In traditional aircraft systems, power inverters are provided, and a plurality of plugs are provided at the seats so that passengers can power their devices. In these designs, one inverter will be connected to several outlets over a single channel, and this channel will include a ground fault interrupter (GFI) connected to the chassis of the aircraft.

One drawback to this design is that a single user can trip the GFI and thus prevent others on the channel from receiving power. In typical designs, when the GFI is tripped, it cannot be reset until the vehicle arrives at the destination, which may be hours away. Thus, other passengers may lose productivity.

Furthermore, traditional AC power inverters are not easily configurable so that extensive redesigns are necessary when certain parameters or requirements are changed.

SUMMARY

To address these issues, provided herein is an easy-to-configure and modify modular power inverter with software control. The advantageous design provided herein permits each individual output to have its own ground fault interrupt protection, overload protection, closed loop control, and feedback. Each output may be independently operated, and also have a short term overload capability.

The short term overload capability allows the inverter to operate at >100% of its long term rated power capacity for some duration of time (e.g., 15 or 20 minutes). This is advantageous, e.g., when a passenger first plugs in the dead laptop—in this situation, the power demand may be high as the laptop charger consumes more power to charge the batter. However, as the battery acquires more charge, the power demand decreases.

The modular nature of the inverter with individual output further means that only a particular channel or that specific output shuts down if an excess of power is consumed on that channel, leaving other outputs/channels in operation.

An example of an operational power profile is described in the following. At T=0, each channel can provide 225 W in an overload state, then after, e.g., 20 min., the channel provides only 150 W per channel in a normal load state. The 20 min. duration for the overload state is software controlled, and can be changed to any duration. However, the overload power and timing should align with heating considerations of the inverter.

The inverter is designed to supply the normal load for an unlimited time duration. Thus, based on the above-described exemplary scenario, and with a three-channel inverter design, the unit can supply 150 W to all three channels forever. However, the inverter can only supply 225 W for specific amount of time before it starts heating up too much, taking into consideration the thermal capacity of the inverter. By having an inverter that has an initial peak capacity, the inverter can be smaller and weigh less than one capable only of a constant output power.

In an advantageous embodiment, the inverter system and respective outputs/channels are controlled by software running on a microcontroller. This provides considerable flexibility in dealing with load management and in altering the levels and the timings. For example, a given channel could provide a greater overload power (e.g., 275 W) but for a shorter period of time (e.g., 10 min.), or a lesser overload power (e.g., 175 W) for a greater period of time (e.g., 45 min.). Additionally, conditions of the overall unit as a whole can be taken into consideration. For example, output 1 may continue at an overload status for a longer duration, possibly indefinitely, if output 2 is not in use or is using very little power. The software control permits significant flexibility in the inverter design that is not available in a pure analog system. Furthermore, when power is exceeded, the system can respond simply by reducing the available power, rather than simply shutting down.

Additionally, the software could take into consideration environmental aspects. For example, if the exterior temperature is relatively cool, the processor could detect this via, e.g., a sensor or other form of temperature data input and allow a greater power and/or a greater overload time—and if the exterior temperature is relatively hot, the processor could do just the opposite.

By modularizing the outputs into separate and independent channels, ground fault interrupts (GFIs) or short circuits that occur on one channel need not affect the other channels. The resetting of GFIs or short circuits can be controlled by the software providing additional flexibility in the handling. Detection of error conditions and even whether a device is utilizing a particular channel and the extent of its use can be monitored in software.

A power inverter is provided herein comprising: a control board comprising: a processor that generates an AC waveform from a pulse width modulation (PWM) signal according to instructions or data stored in a memory associated with the processor; and an output at which a signal having the AC waveform is provided; a power supply module that is connected to the control board, comprising: an input connected to the output of the control board at which the AC waveform signal is provided; and an output at which an AC power signal is provided on a channel of the power inverter.

DESCRIPTION OF THE DRAWINGS

Various embodiments of the invention are illustrated in the following drawings, in which.

DETAILED DESCRIPTION

Figure 1:
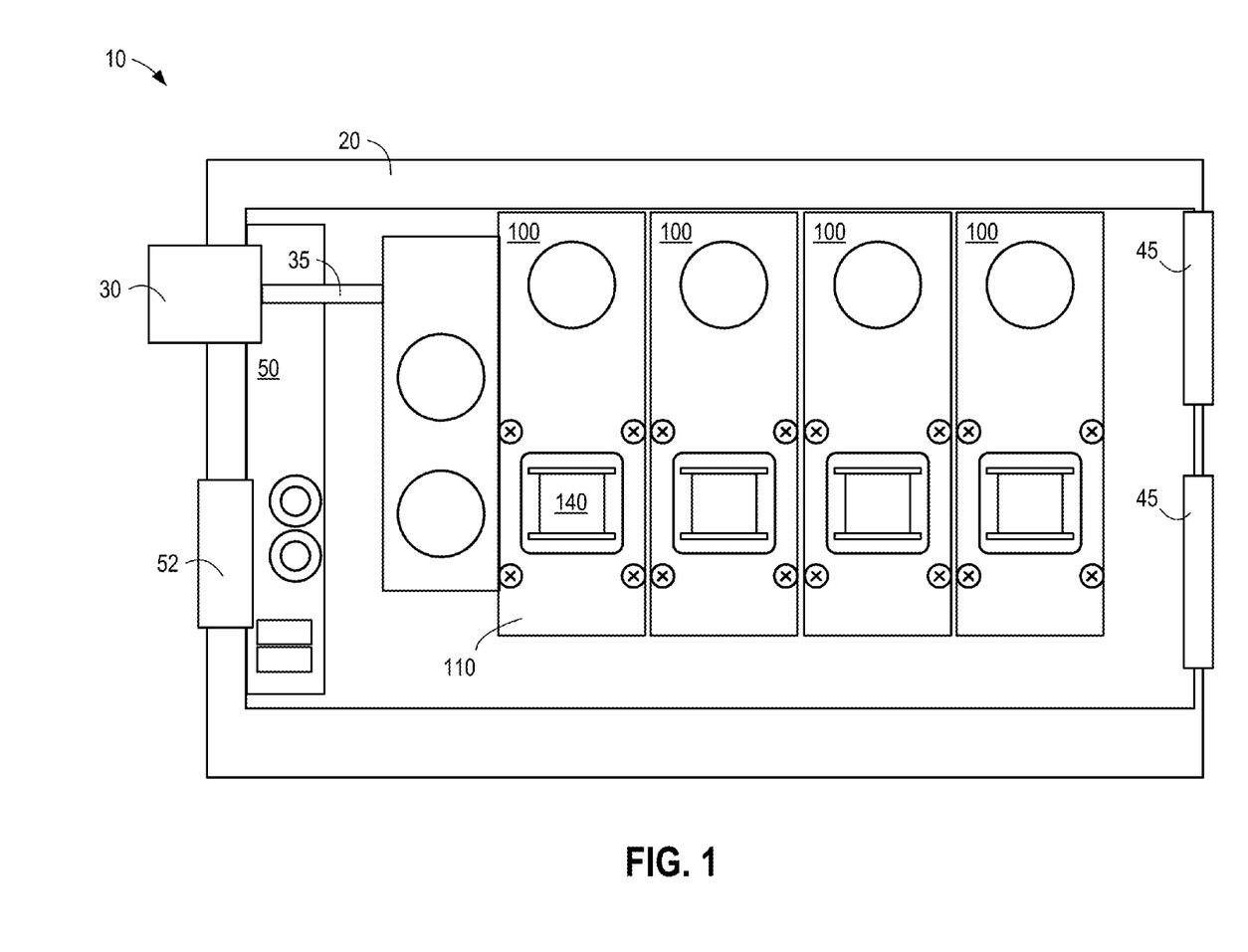
FIG. 1 is a pictorial plan view of an embodiment of the inventive modular inverter system assembled in a case with the cover removed.
Figure 2:
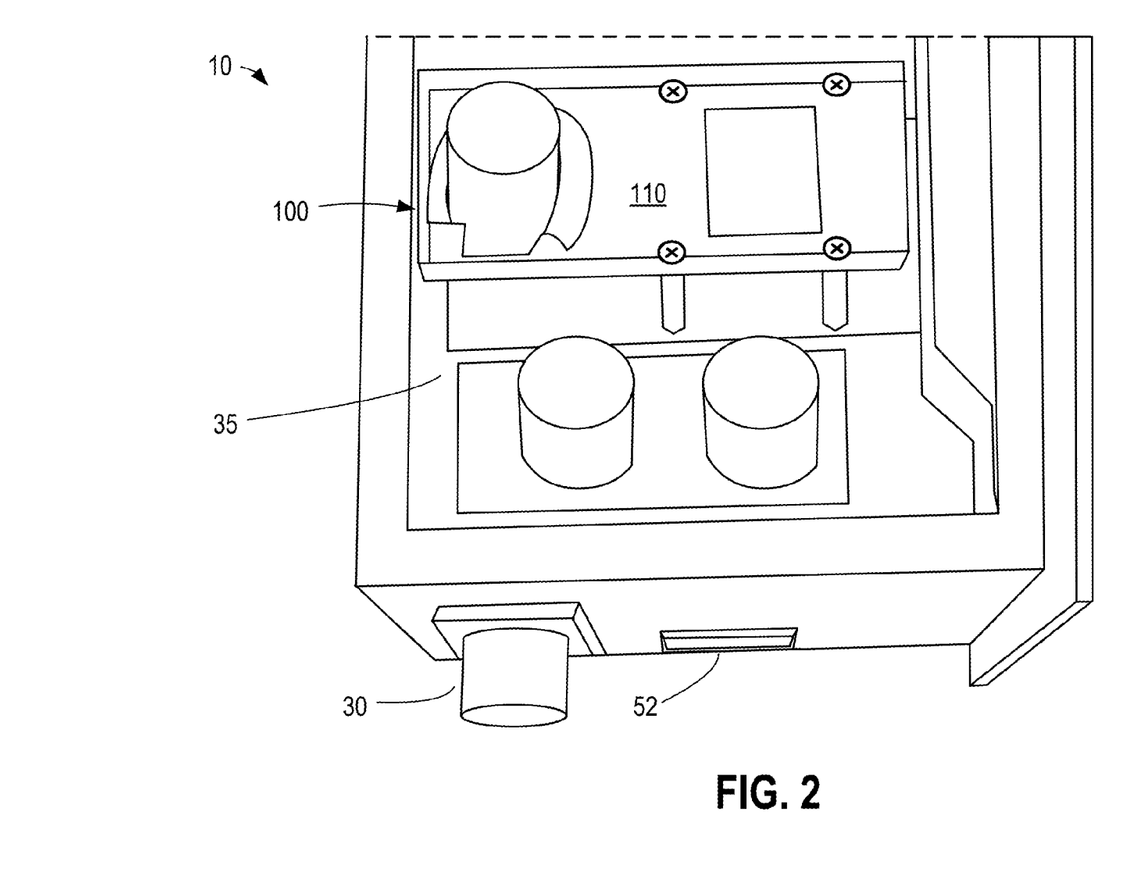
FIG. 2 is a pictorial perspective view of a portion of the inverter showing the case with connectors.

FIGS. 1 and 2 provide an exemplary illustration of the inverter system 10 described above, comprising a case 20 and a power connector 30. The inverter 10 comprises a control board 50 and one or more power supply (PS) modules 100 (four shown), where each power supply module 100 has a hold-down cover 110. The inverter may comprise one or more controllable fans 45. The inverter system 10 can thus comprise a relatively small form factor (e.g., 11.75"×6.5"×2.5", with the PS modules 100 being, e.g., 5.5"×2"×1.75"). The control board 50 may be located in front, as shown in the exemplary embodiment, including relays involved in the processing of power for the inverter 10.

The exemplary power supply modules 100 are each capable of normal load power of 150 W, but a design for any normal load power can be utilized. Additionally, any number of power supply modules 100 can be included within the case 20. For example, a minimalist system might use only one, whereas a larger system could use six or more. The example in FIGS. 1 and 2 uses four.

Furthermore, there need not be a one-to-one correspondence between modules 100 and output channels. For example, one could use four modules to drive two channels, or to drive seven channels—it just depends on how one configures the inverter 10. The inverter 10 has a common input and a common output rail 35 that connects the power supply modules 100 which is provided with, e.g., input power of 28 VDC and a variable digital PWM signal that represents the high voltage AC waveform (e.g., a sine wave), and a common output filter.

Based on this modular and software controlled architecture, new inverter designs for varying output requirements can be designed very easily and quickly. The inverter 10 is thus modularized and made extendable via software control.

The software 200, that may reside on a memory of the control board 50, controls not only the inverter's 10 functionality, safety, and thermal protection, but can also be used to modify all the associated parameters associated with the inverter 10.

In one embodiment, the control board 50 has a first microprocessor 60 (FIG. 3A) that is responsible for the functional control of the inverter 10, and a second microprocessor 65 that generates a sine wave from software so the PWM signal runs an actual output push pull totem pole section of each module 100. Although it is preferable to separate the first and second microprocessors 60, 65, these could be combined into a single processor. Furthermore, these microprocessors 60, 65, can comprise internal memories for storage of programs and operational data.

The processor 65 that generates the sine wave creates the AC wave shape using PWM signals, and the AC wave that is ultimately produced can then be filtered. The software can be used to control not only the frequency (e.g., to change the power output from a 60 Hz system to a 50 Hz system), but also to introduce distortion (described below) into the waveform. There are no oscillators or sawtooth generators to change. The wave shape is entirely controlled by the controller itself in software. The fans 45 can also be software controlled, and may only need to be ramped up if there is a significant amount of heat being produced.

Since the power supply module's 100 input is a PWM signal, and it can generate anything on it's output, up, e.g., 150 V. It can generate sine waves, square waves, triangle waves, etc. It could even be used as a class D audio amplifier if the proper control signals were provided to the modules 100.

Figure 3A:
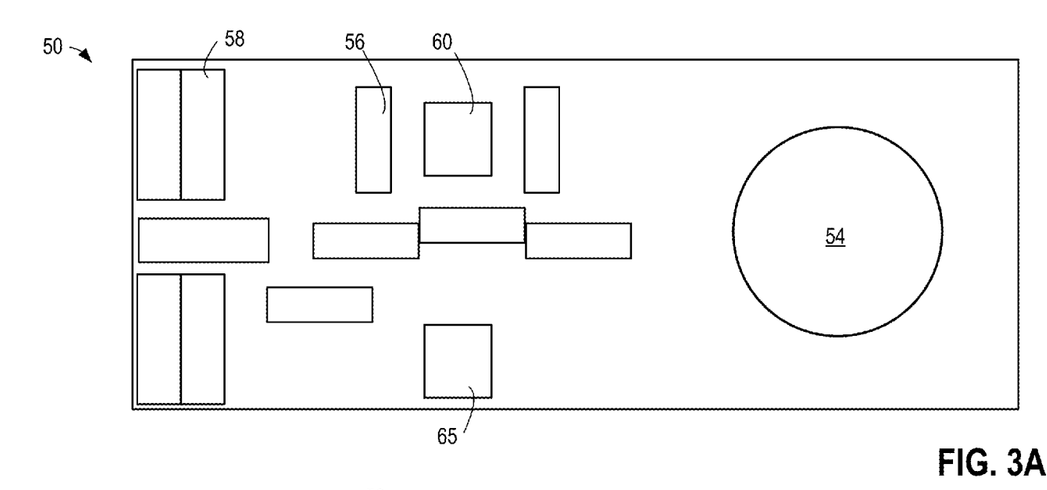
FIGS. 3A and 3B are top and bottom pictorial views of the control module.
Figure 3B:
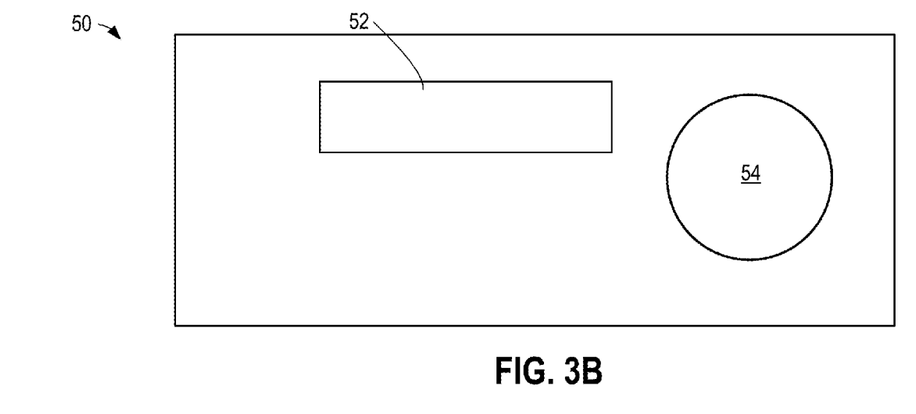

Referring to FIGS. 2, 3A, and 3B, the control board 50 may have a connector 52 on one side that carries the 115 V power return, control signals (e.g., for the switch on the outlet—which may be depressed by the action of a plug being plugged in), and an enable signal for the status LED.

The control board 50 may also have a large opening 54 for the power connector 30. It also includes GFI transformers 56, relays 58, and other components. As noted above, the control PCB may have two microcontrollers 60, 65 on this board, a larger or more powerful one for the primary functional control of the inverter 10, and a smaller one that is for creating the low distortion sine wave. The bus provides control signals from the control board 50 to the modules 100. A specific filter may be provided that is designed to filter out high-frequency pulse width frequency.

One advantage of the software control of the waveform is in the compensation of distortion that may be introduced by heavy loads—for example, the design can take into account the nonlinearities in the power supply rail.

As a user begins to draw a lot of power, the peaks of the AC waveform tend to flatten. The design may include a flyback power supply, that provides a flyback boost. Traditional inverters do not use flybacks—they use forward or push/pull converters. But with the present design, the flybacks are used because they can compensate for any input voltage range, giving them better specifications for, e.g. aerospace applications.

When traditional converters are used, the design is limited to a turns ratio and other aspects in a more rigid architecture, and the aircraft requirements for a voltage range of 18-32 V are difficult to meet. The present design preferably runs the flyback in a boost mode, rather than a buck mode (lowering voltage, rather than raising it, such as is used in a computer power supply). This flyback design is more stable for dealing with a short circuit condition—the gapped cord can handle the short circuit condition without blowing out the MOSFETS, as can happen in other designs.

The flyback converter allows more control, and the voltage can be changed depending on the situation. The present design permits adapting the power wave to be more pointed so that the peaks under load are not flattened out, resulting in significantly reduced distortion. Normally in an aerospace application, 4% total harmonic distortion (THD) might be typical. However, by shaping the waveform, the resulting sine wave can have less than 1.5% THD.

Normally, to achieve these levels of distortion, an inverter would require a closed loop system, but closed loop systems require much additional hardware and complexity. With this design, the system can achieve low THD values in open loop without requiring the expensive and complex digital signal processing needed in a closed system. The closed loop systems can oscillate and be very unstable, particularly when there are inductive and capacitive loads. By keeping the design open loop and putting in a compensating waveform, very low levels of THD in an open loop system are achievable. Furthermore, the wave shape can be optimized for a particular load level to minimize the distortion at that load level.

For example, at no load, the inverter may output 118 V, whereas, at full load, the output might drop down to 110 V. A correction factor from the microprocessor can get averaged into a DC voltage that gets sent to the switching power supply on the inverter modules, so that signal gets mixed with the modules' reference voltage, thus the output rail of their voltage can be adjusted, which is something that cannot be done when using a forward converter. The rail connection, in addition to power and ground, has a signal connection for control, and one of the signals is a DC voltage that may be filtered and mixed with the feedback. The higher the voltage that is provided at this point means the lower the voltage obtained from the power supply is.

By analogy to using an op amp, an op amp with a reference of 3 V with full feedback results in an output of 3 V. But if different resistors are used by the op amp, the output voltage can be adjusted. One can still have an output of, e.g., one to four volts and still have something that it is referencing as a control signal.

This analogy extends to this design. If the AC out can range from 105 V to 126 volts, as the load begins to draw more power, the system can change the duty cycle to lower it, and the output rail goes up or down. The PWM is providing the low distortion sine wave, and the further adjustment mechanism is adjusting the rail. Since the system is looking at the output voltage as an average, it compensates for nonlinear loads.

In a simple power supply, like a cell phone charger, power is only drawn off at the peak of the sine wave, chopping off the top of the sine wave a little. But since by looking at the average voltage out, the rail adjusts accordingly to still provide around 115 V (i.e., it is not looking at any specific part of the waveform). Other controls can be implemented, such as an immediate shutdown if there is decompression in the plane.

A temperature sensor can be used to check the temperature of the internal air and thus determine directly or indirectly, via extrapolation, the temperature of the hottest part. The software that creates the PWM characterize the appropriate wave shape for different loads so that the PWM would have less than 1% distortion at any load using an open loop design. Because how much load there is can be easily determined using the main microprocessor 60, signals could be provided to the smaller microprocessor 65 to direct use of a particular profile from a number of stored profiles. This provides a simple way of reducing distortion under varying load conditions without requiring a full closed loop system. Thus, using open loop with an inverse function of distortion provides a significant advantage to this design.

The inverter can be designed to only enable output power when something is plugged in. Thus, the outlet can indicate with, e.g., an LED light, that the outlet is working, but the inverter does not need to turn the outlet on until the passenger plugs something into it (detected by the inverter) and is not using any power or resources.

Figure 4:
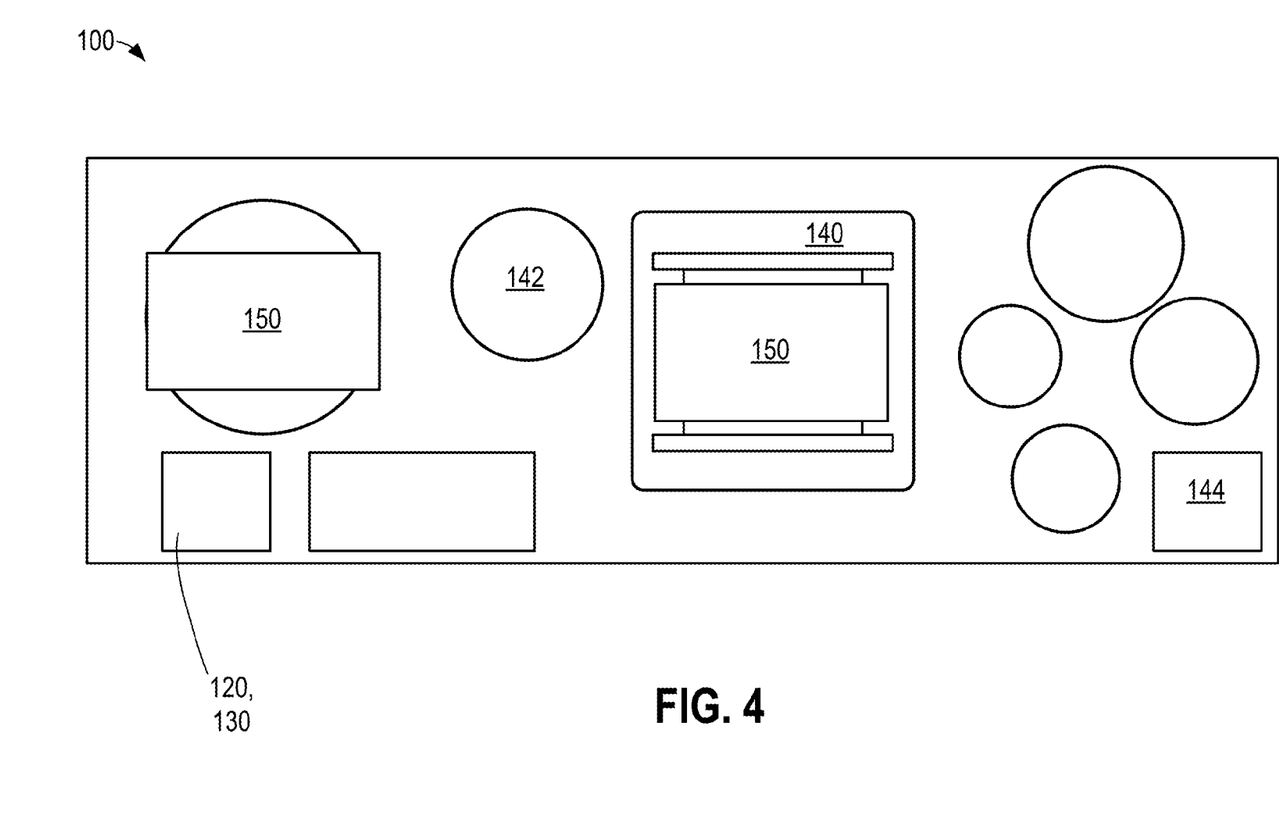
FIG. 4 is a top pictorial view of a power module with its cover removed.

The modules 100 comprise hold-down covers/brackets 110 that also address thermal issues with the modules 100 themselves. Referring to FIG. 4, three components of the modules 100 that are most likely to get warm are the transformer 140, the inductor 142, and the power MOSFETs 144. Traditional designs utilize large thermal components, power transistors that stand up and that have to be screwed into a heat sink.

Figure 5:
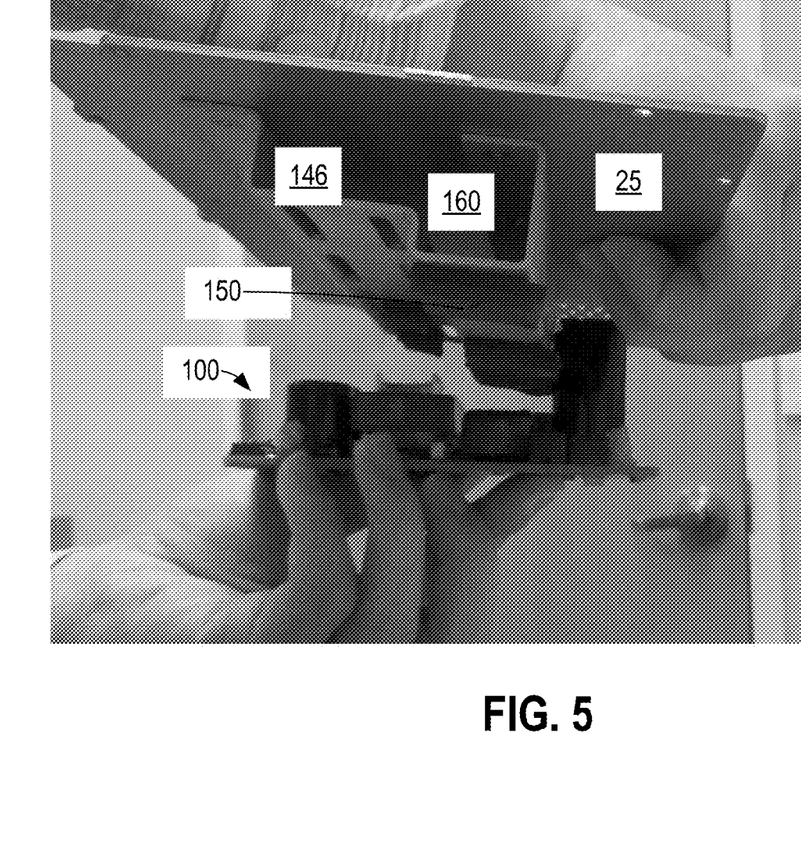
FIG. 5 is a pictorial perspective view showing the mounting of the power module onto the heat sink of the inverter case cover.
Figure 6:
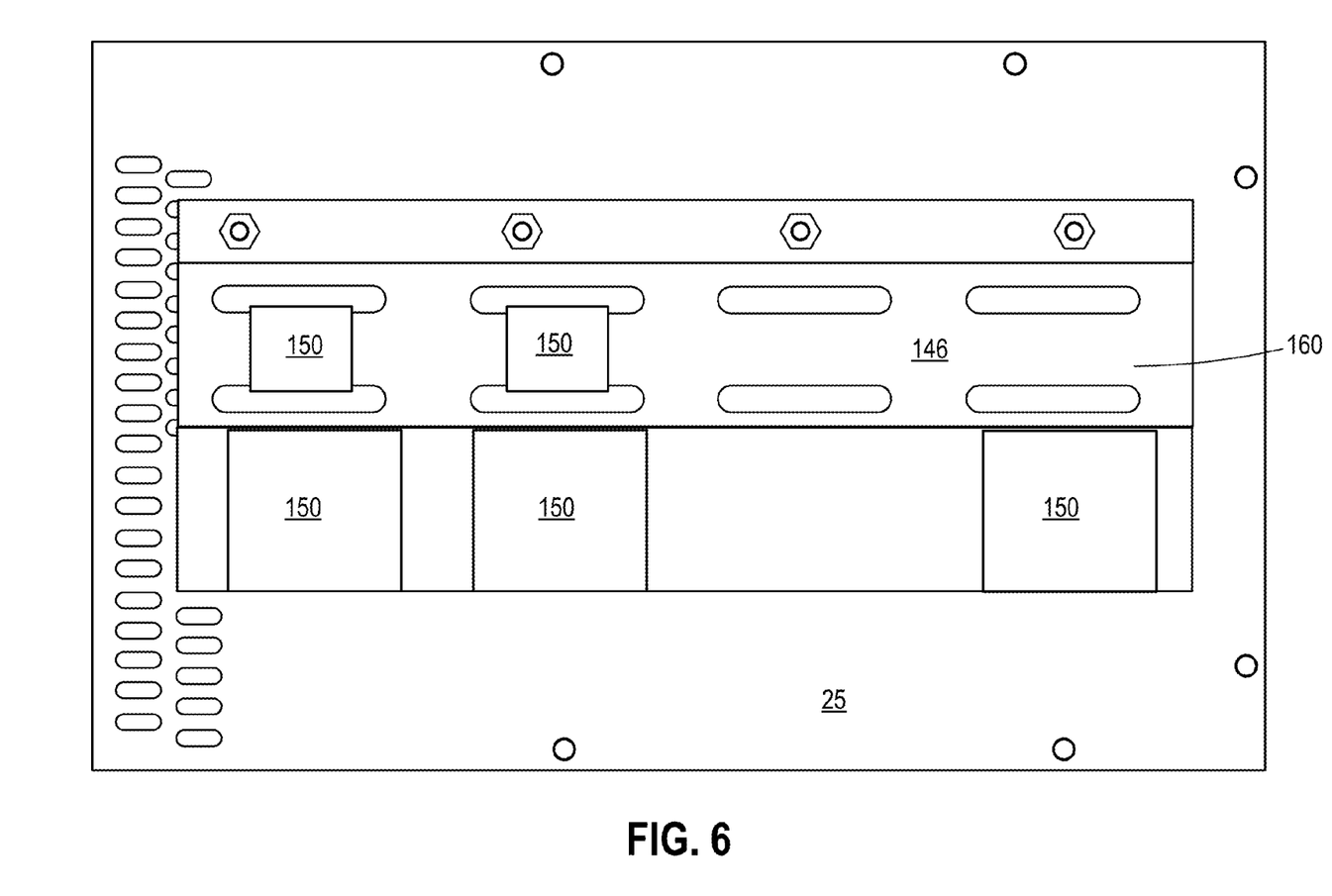
FIG. 6 is a pictorial plan view of the heat sink and cover.

Referring to FIGS. 5 and 6, in an embodiment of the design here, surface mount transistors 144 contact thermal vias (air channel) 160 going to the bottom of the board (inverter case cover 25) that conduct heat through the board to the bottom, and this gets screwed into a heat sink 146 connected to the cover 25. The heat sink 146 may comprise a bent metal component that presses against the components. Heat thus goes through the PCB into the heat sink 146 and the transistors do not have to be floating around with wires, making the design much more robust.

The heat from the transistors 144 goes into the faceplate, and the part that holds it down may use thermal pads 150 pressing into the transformer 140 and the inductor 142 to take the heat away, and an air channel 160 may be provided so that air may flow through. Thus, the fans 45 can have a turbulent free clean flow through to cool down all of the heat that is coming off of the inductor 142 and the transformer 140—the heat from the transistors 144 goes into the heat sink, and has channels to pass the air through. The airflow and cooling system may not actually require the fans 45 to work for medium power operation, because there is actual conduction through the metal (e.g., aluminum). Thus, the fans may only need to be turned on a small percentage of the time. Mechanically, the vertical design of the modules 100 requires strength to withstand vibration well. Gussets can be welded in to stabilize the modules 100. The modules 100 may comprise a connector that includes PWM signal inputs 120 and the A/C power output 130.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

TABLE OF REFERENCE CHARACTERS

| | |
|---|---|
| 10 | inverter system |
| 20 | inverter case |
| 25 | cover for inverter case |
| 30 | power connector (input/aircraft) |

-continued

TABLE OF REFERENCE CHARACTERS

| | |
|---|---|
| 35 | common input/output rail |
| 40 | output filter |
| 45 | fans |
| 50 | control board |
| 52 | control board connector |
| 54 | opening |
| 56 | GFI transformer |
| 58 | relays |
| 60 | first microprocessor |
| 65 | second microprocessor |
| 100 | power supply modules |
| 110 | module hold-down cover |
| 120 | PWM signal input |
| 130 | output |
| 140 | transformer |
| 142 | inductor |
| 144 | surface mount transistors |
| 146 | heat sink |
| 150 | thermal pads |
| 160 | air channel |
| 200 | software |

What is claimed is:

1. A power inverter comprising:
a control board comprising:
a processor that generates an AC waveform from a pulse width modulation (PWM) signal according to instructions or data stored in a memory associated with the processor; and
an output of the control board at which a signal having the AC waveform is provided;
a power supply module (PSM) that is connected to the control board, comprising:
an input connected to the output of the control board at which the AC waveform signal is provided; and
an output at which an AC power signal is provided on a channel of the power inverter;
a case that surrounds the control board, the PSM, and a second PSM, the case comprising, on its exterior, a power connector that provides power on a plurality of independent power channels, and a control board connector,
wherein
each PSM has a predefined power rating at which it can provide power indefinitely; and
each PSM can provide power at greater than the predefined power rating if a condition is met.

2. The inverter of claim 1, further comprising:
a separate ground fault interrupter (GFI) on each power channel wherein tripping a GFI on one channel allows power to be provided on another channel.

3. The inverter of claim 1, wherein the condition is operating at the greater power for only a limited time.

4. The inverter of claim 1, wherein the condition is operating another PSM at lower than the predefined power rating.

5. The inverter of claim 1, wherein the processor stores algorithms that manage the use of greater power by a PSM.

6. The inverter of claim 1, wherein power output is only enabled on a channel when something is plugged in to the channel.

7. The inverter of claim 1, wherein the PSM comprises a push-pull totem pole section that drives the PSM output.

8. The inverter of claim 1, wherein the PSM comprises a flyback power supply that provides a flyback boost.

9. The inverter of claim 1, wherein the frequency is completely controlled by the processor.

10. The inverter of claim 1, wherein the waveform is completely controlled by the processor.

11. The inverter of claim 10, wherein the processor compensates for load distortion by adjusting a shape of the waveform in response to heavy loads.

12. The inverter of claim 11, wherein the compensation is a sharpening of a wave peak.

13. The inverter of claim 11, wherein the compensation operates in open-loop mode.

14. The inverter of claim 11, wherein the heavy load is determined by a measure of temperature.

15. The inverter of claim 1, wherein the PSM comprises a hold-down cover located generally on an opposite side of components from a printed circuit board (PCB) on which the components are mounted.

16. The inverter of claim 1, wherein the PSM is attached to a heat sink comprising air channels, and the heat sink is attached to a case surrounding the control board and the PSM.

17. The inverter of claim 16, further comprising a temperature-controlled fan that blows air through the air channels.

18. The inverter of claim 16, further comprising thermal pads positioned directly between the heat sink and components of the PSM.

* * * * *